United States Patent [19]

Kennedy et al.

[11] Patent Number: 5,733,998
[45] Date of Patent: Mar. 31, 1998

[54] METHOD, DISPERSING AGENT AND INITIATOR FOR THE DISPERSION POLYMERIZATION OF ISOBUTYLENE

[75] Inventors: Joseph P. Kennedy; Tibor Pernecker, both of Akron, Ohio

[73] Assignee: The University of Akron, Akron, Ohio

[21] Appl. No.: 623,854

[22] Filed: Mar. 26, 1996

[51] Int. Cl.[6] ................................ C08C 77/442
[52] U.S. Cl. ................ 628/25; 525/106; 526/139; 526/194; 526/348.7
[58] Field of Search ............. 526/348.7, 194, 526/134; 525/106; 528/25

[56] References Cited

U.S. PATENT DOCUMENTS

| | | | |
|---|---|---|---|
| 2,995,547 | 8/1961 | Sellen et al. | 525/106 |
| 3,522,228 | 7/1970 | Fukui et al. | 260/94.9 |
| 4,748,220 | 5/1988 | Hartmann et al. | 526/89 |
| 4,758,631 | 7/1988 | Kennedy et al. | 525/245 |
| 4,808,664 | 2/1989 | Saam | 525/106 |
| 5,247,021 | 9/1993 | Fujisawa et al. | 525/254 |
| 5,312,882 | 5/1994 | DeSimone et al. | 526/201 |
| 5,376,744 | 12/1994 | Kennedy et al. | 526/89 |
| 5,446,117 | 8/1995 | Baird et al. | 526/134 |
| 5,448,001 | 9/1995 | Baird et al. | 526/134 |
| 5,543,479 | 8/1996 | Baade et al. | 526/88 |

OTHER PUBLICATIONS

"Cationic Polymerizations in Liquid and Supercritical Carbon Dioxide" by Clark et al., *Polym. Prep.* 37, pp. 365–366, (1996).

*Primary Examiner*—Ralph M. Dean
*Attorney, Agent, or Firm*—Renner, Kenner, Greive, Bobak, Taylor & Weber

[57] ABSTRACT

The dispersion polymerization of isobutylene includes a dispersing agent. The dispersing agent is a compound having a $CO_2$-phobic moiety and at least one $CO_2$-philic moiety. The $CO_2$-phobic moiety is polysibutylene-philic. Novel polymerization initiators are organometallic.

26 Claims, 3 Drawing Sheets

METHOD, DISPERSING AGENT AND INITIATOR FOR THE DISPERSION POLYMERIZATION OF ISOBUTYLENE

TECHNICAL FIELD

The invention generally relates to the cationic, dispersion polymerization of isobutylene monomer. The invention also relates to such a polymerization in liquid carbon dioxide using a dispersing agent. The inventive dispersing agent has a $CO_2$-phobic moiety and at least one $CO_2$-philic moiety, where the $CO_2$-phobic moiety is also polyisobutylene-philic.

BACKGROUND OF THE INVENTION

Carbocationic polymerizations are well known and provide many polymers such as isobutylene polymers and copolymers (butyl rubber). They are also known for their ability to form block copolymers and telechelic polymers. They are typically conducted in chlorinated hydrocarbon solvents at temperatures between −20° and −100° C. The chlorinated hydrocarbon solvents are used because they have sufficient polarity to stabilize the transition states, and thus lower the activation energy for ion generation in carbocationic polymerization. The low temperatures are used to slow the termination and chain transfer processes that limit the growth in the molecular weight of the polymer chains. Less polar solvents are less effective at stabilizing transition states, and thus fewer carbocations are produced that are active in polymerization. The solvent also needs to act as a fluid heat transfer medium to dissipate the heat of polymerization. The solvent should dissolve the ingredients of the polymerization.

Carbocationic polymerizations are described by J. P. Kennedy and E. Marechal in "Carbocationic Polymerization" published by Wiley-Interscience, N.Y. 1982. Carbocationic polymerizations are chain polymerizations where an active species (thought to be carbocations) is created from one or more terminal carbon atoms of a molecule (i.e., one molecule may have two or more carbocation termini). These active terminal carbons are capable or reacting with unsaturated carbons of olefinic type monomers forming a carbon-carbon single bond between the active terminal carbon and one of the unsaturated carbons in the olefin. In the course of this addition reaction, an active species is generated from a carbon in the olefin type monomer. Since an active cationic terminus is regenerated after each reaction of a terminal cation, the process can proceed to high molecular weight materials from unsaturated olefinic monomers.

Carbocationic polymerizations are distinguished from free radical and anionic polymerizations even though all three are chain polymerizations. Carbocationic polymerizations are thought to occur by adding monomers to a terminal carbocation. Radical polymerizations occur by adding monomers to a terminal free radical. Anionic polymerizations are characterized by adding monomers to a negatively charged terminal carbon. One skilled in polymerizations distinguishes these three polymerization types by the ability (or inability) to add olefinic monomers or copolymerize with certain monomers. These types of polymerizations may also be distinguished by their sensitivity to termination by various species known to terminate anions, cations, or free radicals. These matters are explained in George Odian's book "Principles of Polymerization" Wiley Interscience: New York, 2nd ed, pp. 180–183, 340–341.

Attempts were made to carbocationically polymerize isobutylene using coinitiators 2-chloro-2,4,4-trimethylpentane/$TiCl_4$ at −50° C. in liquid carbon dioxide ($CO_2$) but this resulted in heterogeneous (precipitation) polymerizations and ill-reproducible results. R. H. Biddulph and P. H. Plesch, "The Low-Temperature Polymerization of Isobutene Part IV Exploratory Experiments", *J. Chem. Soc.* 1966, 3913 (1960), discussed polymerizations of isobutylene in liquid $CO_2$ using $TiCl_4$, $AlBr_3$.

Estimates were made of the highest probable molecular weight of a polyisobutylene obtainable at 41° C. in traditional chlorinated solvents by carbocationic techniques instead of at −100° C. Based on the increase in the rates of chain termination and chain transfer at the higher temperature, it is anticipated based on extrapolation of the data in "Cationic Polymerization: A Critical Inventory", by J. P. Kennedy, John Wiley Interscience, N.Y., 1975, that the molecular weight, of the polymer produced would decrease from 1,000,000 at −100° C. to about 400 at polymerization temperatures of 36° C.

Supercritical carbon dioxide ($SC-CO_2$) has been used for a variety of applications (e.g., to decaffeinate coffee, to liquify coal, to remove cholesterol from egg yolks) and a considerable body of knowledge exists on its use in extractions. Carbon dioxide is supercritical at and above 31.1° C. and at or above 73 atmospheres.

Solution in suspension polymerizations of isobutylene, but not dispersion polymerizations, have also been investigated. The solvents commonly employed in such polymerizations include chlorinated hydrocarbons (i.e., $CH_2Cl_2$, $CH_3Cl$) and aliphatic hydrocarbons (n-hexane) and mixtures of those. Dispersion polymerizations, commonly in water, in which case it is called an emulsion polymerization, of a number of monomers has also been practiced. Finally, a large amount of effort and research has related to surfactants, dispersion theory and the like, including the design of dispersing agents for a specific applications. However, there is no information on dispersing agents (surfactants) for isobutylene polymerization in liquid $CO_2$. Likely this is because $CO_2$ is not a solvent for polyisobutylene.

There have been attempts to polymerize isobutylene monomer by using polystyrene as a dispersing agent. Limited success has been achieved due to the fact that styrene monomer is IB-philic. However, the processes employing polystyrene have proved to be deficient, it is believed, due to the fact that polystyrene is PIB-phobic.

A need exists, therefore, for a surfactant which will promote and allow the dispersion polymerization of polyisobutylene in liquid $CO_2$. There is also a need for an improved polymerization of isobutylene. This would include not only an improvement in the polymerization but also art improvement in preferably, the initiator employed therewith.

SUMMARY OF INVENTION

It is an object of the present invention to provide for the preparation of polyisobutylene and isobutylene copolymers.

It is another object of the invention to provide a method for preparing polyisobutylene and isobutylene copolymers by dispersion polymerization.

It is a further object of the invention to provide for a dispersing agent for use in the dispersion polymerization of polyisobutylene and isobutylene copolymers.

It is yet another object of the invention to provide for a polymerization initiator for use in the dispersion polymerization of polyisobutylene.

It is a still further object of the invention to provide a method for the dispersion polymerization of isobutylene in liquid $CO_2$.

These and other objects together with the advantages thereof over the existing art, which shall become apparent from the specification which follows, are accomplished by the invention as hereinafter described and claimed.

In general, the present invention provides a dispersing agent for the dispersion polymerization of isobutylene in liquid $CO_2$. The dispersing agent comprises a compound having a $CO_2$-phobic moiety and at least one $CO_2$-philic moiety. The $CO_2$-phobic moiety is also polyisobutylene-philic.

There is also provided according to the invention, a method of preparing a dispersing agent comprising the steps of cationically polymerizing isobutylene with a Friedel-Crafts reagent, and a mono- or bi-functional polymerization initiator, resulting in a living polymer. The method also includes terminating the living polymer with an allyl organosilane compound to produce an allyl-terminated polyisobutylene; and, hydrosilylating the allyl-terminated polyisobutylene by reacting it with a siloxy silane compound.

A method for the preparation of polyisobutylene by the cationic polymerization of isobutylene monomer, according to the invention, comprises the step of polymerizing isobutylene monomer dispersed in a medium containing liquid carbon dioxide, a cationic polymerization initiator, a Friedel-Crafts acid co-initiator, a cosolvent suitable for cationic polymerization and a dispersing agent. The dispersing agent has a $CO_2$-phobic moiety and at least one $CO_2$-philic moiety, wherein the $CO_2$-phobic moiety is also polyisobutylene-philic.

There is also provided according to the invention, a method for the preparation of polyisobutylene by the cationic polymerization of isobutylene monomer, which method comprises the step of polymerizing isobutylene monomer dispersed in a medium containing liquid carbon dioxide, an organo-metallic polymerization initiator and a dispersing agent. The dispersing agent has a $CO_2$-phobic moiety and at least one $CO_2$-philic moiety, wherein the $CO_2$-phobic moiety is also polyisobutylene-philic.

An organo-metallic, cationic polymerization initiator according to the invention comprises from about $1 \times 10^{-5}$ to about 1 mole of Cp*TiMe$_3$ and from about $1 \times 10^{-5}$ to about 1 mole of $B(C_6F_5)_3$.

PREFERRED EMBODIMENT FOR CARRYING OUT THE INVENTION

Figure 1:
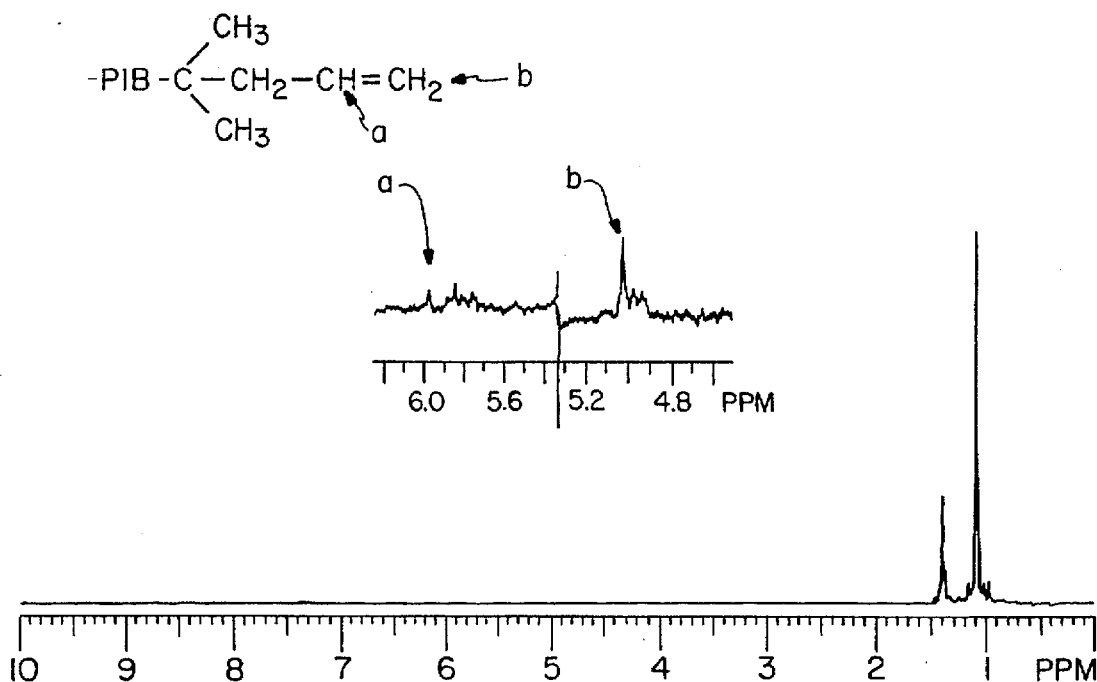
FIG. 1 is representative of a $^1H$ NMR spectrum of an allyl-terminated PIB.

As will be fully demonstrated below, the present invention provides for the polymerization of isobutylene monomer to form polyisobutylene (PIB). The preferred polymerization is a dispersion polymerization in liquid $CO_2$ using a novel dispersing agent or "surfactant". A novel initiator also provides for improved molecular weights in such a dispersion polymerization.

The inventive dispersing agent is a compound having a $CO_2$-phobic moiety and at least one $CO_2$-philic moiety. Preferably, the $CO_2$-phobic moiety is also polyisobutylene-philic. More preferably, the $CO_2$-phobic moiety has a polyisobutylene moiety and at least one aliphatic hydrocarbon moiety whose monomer has from about 4 to about 20 carbon atoms. A preferred dispersing agent has from about 1 to about 80 percent by weight of the $CO_2$-phobic moiety and from about 1 to about 80 percent by weight of the philic moiety.

As used herein, the term "phobic" is understood to have the connotation of being "incompatible" and the term "philic" has the connotation of being "compatible".

An example of a useful $CO_2$- phobic moiety is a radical selected from the group consisting of

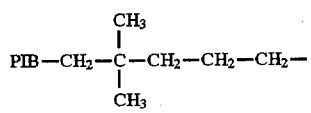

and

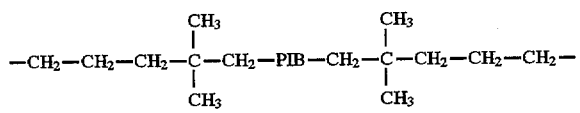

wherein PIB is

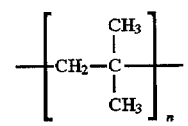

and wherein n is an integer of from about 2 to about 50. As one skilled in the art will understand, the polymer grows at "PIB", and the last repeating unit of the PIB has been shown in the formulas provided hereinabove.

A preferred $CO_2$-philic moiety for the inventive dispersing agent is an alkyl siloxy silane having from about 9 to about 60 carbon atoms. One preferred $CO_2$-philic moiety is a radical having the structure

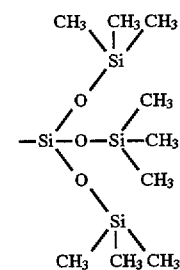

Examples of preferred dispersing agents include

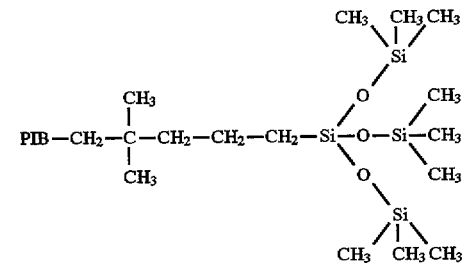

(hereinafter referred to as PIB-TMSS) and

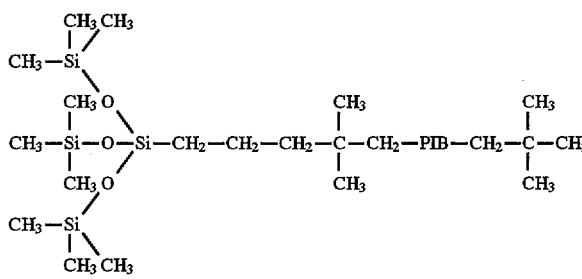

(hereinafter referred to as TMSS-PIB-TMSS) where again, PIB and "n" are as above described.

A method of preparing the inventive dispersing agent includes cationically polymerizing isobutylene with a Friedel-Crafts reagent, and a mono- or bi-functional polymerization initiator, resulting in a living polymer. The living polymer is a chlorine-terminated polyisobutylene prepared by the use of for example, a 2-chloro-2,4,4-trimethylpentane/TiCl$_4$ initiating system in the presence of N,N-dimethylacetamide as the electron pair donor. A detailed description of this procedure is set forth in "Electron Pair Donors in Carbocationic Polymerization. III. Carbocation Stabilization by External Electron Pair Donors in Isobutylene Polymerization" Kaszas et al., *J. Macromol. Sci. Chem.*, A26, 1099 (1989), the disclosure of which is incorporated herein by reference.

As to the initiator used, a mono-functional initiator will result in PIB-TMSS whereas a bifunctional initiator will result in TMSS-PIB-TMSS. Reaction conditions are those typically employed in liquid carbon-dioxide polymerizations. For example, typical temperatures for these polymerizations will vary from about −80° C. to about 23° C. Reaction times will vary depending upon the amount of polymer desired, its desired or target molecular weight and the like.

The amounts of each reactant or component will vary depending upon the amount of product desired, as one skilled in polymerizations will understand. As is normally the case, an excess of each reactant or component is employed.

The living polymer is terminated with from about 1 to about 10 moles based upon 1 mole of the living polymer, with an allyl organosilane compound to produce an allyl-terminated polyisobutylene, that is, PIB-Allyl or Allyl-PIB-Allyl, again depending upon the mono- or bi-functionality of the initiator employed.

The allyl -terminated PIB is hydrosilylated by reacting it with from about 1 to about 10 moles based upon 1 mole of the PXB-terminated polymer, with a siloxy silane compound, thus forming the PIB-TMSS or the TMSS-PTB-TMSS depending upon the initiator employed. The resulting polymer is terminated and isolated in any conventional manner, such as using water, isopropyl alcohol or the like, followed by vacuum drying, drum drying or the like.

A cationogen reactive with the Friedel-Crafts acid is required to induce polymerization. This may be a protic acid, or an alkyl halide having from 6 to 20 carbon atoms, such as TMPCl (2-chloro-2,4,4-trimethylpentane) or a branched hydrocarbon having from 6 to 20 carbon atoms and at least one halide. Other examples of cationogens are:

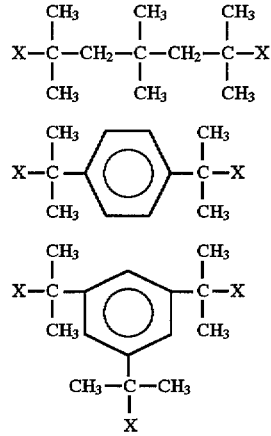

where X may be Cl, OH, or OCH$_3$.

Useful coinitiators include Friedel-Crafts acids such as TiCl$_4$, AlCl$_3$, AlBr$_3$, BF$_3$, BCl$_3$, SnCl$_4$, ZnCl$_2$, ZrCl$_4$, and the like. The preferred coinitiators are AlCl$_3$, BCl$_3$, SnCl$_4$, BF$_3$, TiGl$_4$, and their alkylated derivatives where the alkyl group desirably has from 1 to 4 carbon atoms. The coinitiators may be used as mixtures of coinitiators.

A preferred allyl organosilane compound is allyltrimethylsilane, and preferred siloxy silane compounds include mono-tris(trimethyl siloxy) silane and di-tris (trimethyl siloxy) silane.

The inventive dispersing agent is employed to prepare PIB in liquid CO$_2$ by cationic polymerization. The method includes polymerizing isobutylene monomer dispersed in a medium containing liquid carbon dioxide, a cationic polymerization initiator, a Friedel-Crafts acid co-initiator, a cosolvent suitable for cationic polymerization and the above described dispersing agent. The Friedel-Crafts acid and cosolvent include those as described hereinabove. The resulting polymerization can be terminated and the polymer isolated in any conventional manner, including those discussed above with respect to the inventive dispersing agent.

The initiator or initiators useful in the polymerization of isobutylene using the inventive dispersing agent include all those commonly used in cationic polymerizations. Preferred initiators include those listed above for the polymerization forming the dispersing agent according to the invention, such as for example, water, 2-chloro-2,4,4-trimethylpentane, mixtures thereof and the like.

Useful cosolvents include all those commonly used in cationic polymerizations, such as for example, CH$_2$Cl$_2$, CH$_3$Cl, toluene, ethylene dichloride, chlorobenzene, CS$_2$, SO$_2$, ethyl chloride, mixtures thereof and the like.

One preferred and inventive initiator is an organo-metallic initiator system. The term "system" is employed because this initiator is a mixture of two organo-metallic compounds.

The first is

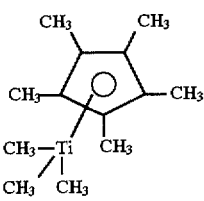

which will be referred to herein as Cp*TiMe$_3$. Other first components include metallocenes such as those having the formula

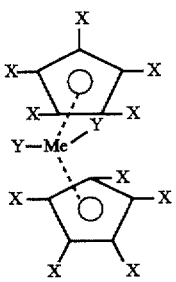

where Me is Ti, Zr or Hf; X is —H, —CH$_3$ or —C$_2$H$_5$; and Y is —Cl, —Br, —CH$_3$, —C$_2$H$_5$, —OCH$_3$, —OC$_2$H$_5$, —OiPr (isopropene), —OiBu (isobutene) or —C$_6$H$_5$ (phenylene).

The second component of the organo-metallic initiator system is

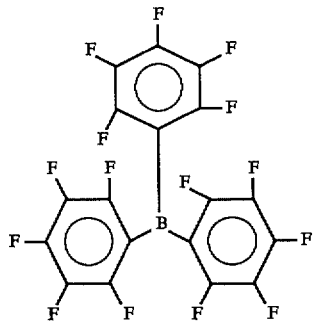

which will be referred to as B(C$_6$F$_5$)$_3$. Other second components include alkylaluminoxanes, such as those having the formula (RA10)m where R is —CH$_3$ or —C$_2$H$_5$, and m is an integer of from about 1 to about 50. Still further useful second components include tetraphenylborates and related anions, such as [Bu$_3$NH][B(C$_6$F$_5$)$_4$]; [Bu$_3$NH][B(C$_6$H$_5$)$_4$]; B(C$_6$F$_5$)$_3$ and B(C$_6$H$_5$)$_3$.

A preferred amount of each component of the initiator system is from about 1×10$^{-5}$ to about 1 mole of Cp*TiMe$_3$ and from about 1×10$^{-5}$ to about 1 mole of B(C$_6$F$_5$)$_3$. Each is mixed as a solution in a solvent such as toluene, n-hexane, or the like. It has been found that higher molecular weight PIB can be formed using this initiator in the dispersion polymerization discussed above and as will be exemplified hereinbelow.

GENERAL EXPERIMENTAL
1. Synthesis of Dispersing Agents

In order to demonstrate the practice of the invention, TMSS and di-TMSS were first prepared as follows. All molecular weights are weight average unless overwise stated. By the use of a monofunctional or bifunctional initiator, respectively, isobutylene or "IB" is polymerized by living cationic polymerization process to PIBCl$^t$ or Cl$^t$PIBCl$^t$, and without isolating these intermediates they are converted by the addition of allyltrimethylsilane (AllylSiMe$_3$) to the corresponding mono-allyl or di-allyl terminated PIBs; by conventional methods. Subsequently the mono- or di-allyl-terminated PIBs are converted to the target surfactants by the addition of TMSS (a commercial product available from Shin-Etsu Chemical Co., Ltd. and Petrarch Co.) and hydrosilylation.

The polymerization of IB was carried out in a 500 mL round bottom flask equipped with stirrer at −80° C. in a dry box, under dry nitrogen. The 2-chloro-2,4,4-trimethylpentane (TMPCl) (4.4 10$^{-3}$ mole) was dissolved in a mixture of 180 milliliters of "mL" CH$_3$Cl and 120 mL n-hexane. A solution of 6.9 10$^{-2}$ mole TiCl$_4$ in hexane was added to the initiator solution, followed by the addition of 4.6 10$^{-3}$ mole dimethylacetamide (DMA). The initiator system was stirred for 5 minutes at −80° C. The polymerization was started by rapidly adding under agitation 28 mL (0.36 mole) IB to the initiating system. After 50 minutes 15 mL (9.4 10$^{-2}$ mole) AllylSiMe was added to the charge. The reaction was terminated after 60 minutes by adding 20 mL prechilled methanol. The mono-allyl-terminated polyisobutylene was precipitated twice from methanol and dried in vacuum. Yield 20.1 grams (99% conversion). According to GPC analysis M$_n$=5200, M$_w$/M$_n$=1.23. The allyl-functionality of PIB was analyzed by $^1$H NMR spectroscopy (FIG. 1). The integration of =CH$_2$ proton resonances at 4.9–5.1 ppm relative to the sum of —CH$_2$ and —CH$_3$ PIB protons showed that the allylation was essentially complete.

Figure 2:
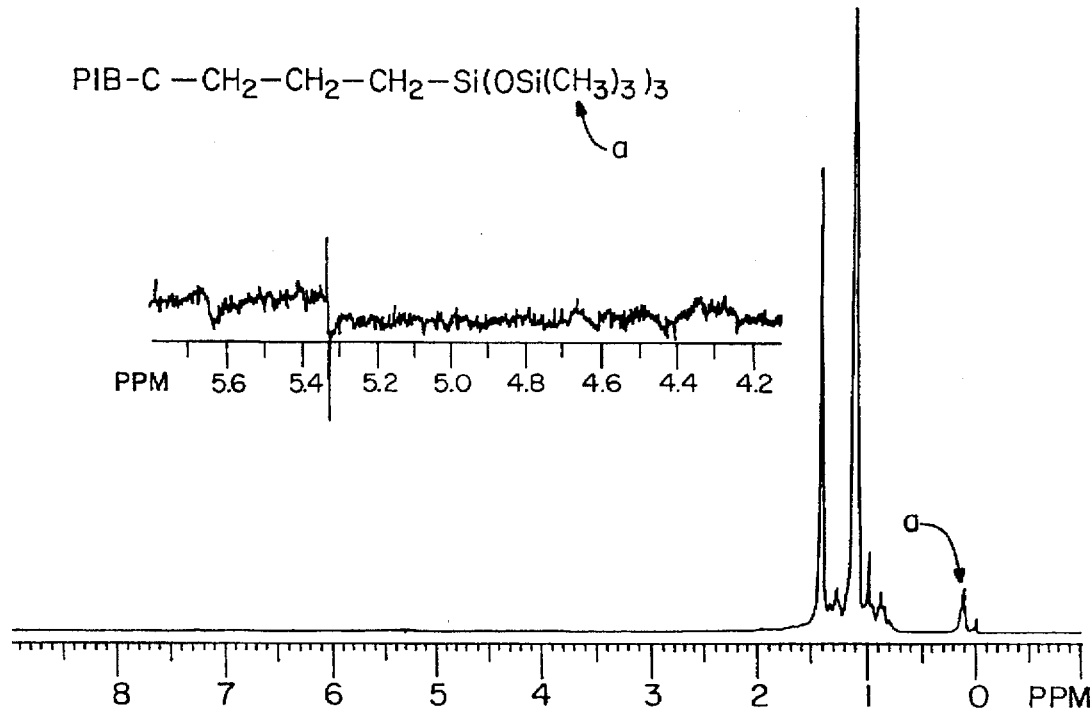
FIG. 2 is representative of a $^1H$ NMR spectrum of a TMSS-ended PIB.

The synthesis of diallyl-terminated PIB was carried out in the same manner except di(2-chloro-2-propyl)benzene (dicumyl chloride) (4.4 10$^{-3}$ mole) was used as initiator in the polymerization. The GPC analysis of diallyl-terminated PIB gave M$_n$=4800, M$_w$/M$_n$=1.19. According to $^1$H NMR analysis showed quantitative allylation was obtained. The hydrosilylation of mono- and diallyl-terminated PIB was carried out in a 300 mL Hasteloy C Parr pressure reactor at 150° C. Thus, 9.3 grams of mono- or di allyl-terminated PIB (1.77 10$^{-3}$ and 1.91 10$^{-3}$ mole, respectively) was dissolved in 150 mL n-hexane together with 5.8 mL (1.95 10$^{-2}$ mole) TMSS in the presence of 3 mL Pt containing catalyst solution (0.5% H$_2$PtCl$_6$ dispersion in toluene) (100 ppm). After three days of stirring, the solvent was removed and the polymer precipitated in methanol, 8.2 grams (yield=89% conversion), and the product was recovered. GPC analysis gave essentially the same results as before hydrosilylation indicating M$_n$=5200, M$_w$/M$_n$=1.21. According to $^1$H NMR spectroscopy (see FIG. 2) no unreacted terminal allyl group was detected, i.e., the hydrosilylation was complete.

2. Dispersion Polymerization of IB Liquid CO$_2$

The results of Experiments 1–7 are combined in Table I. Polymerizations 1–6 were carried out in a 300 mL Parr reactor made of Hasteloy C immersed in a Dry Ice/isopropanol cooling bath. The reactor was equipped with two sapphire windows 180° apart, a magnetically driven stirrer, a thermocouple and an inconel rupture disc. Prior to experiment the reactor was purged with dry nitrogen and 120° C. overnight. The reactor was charged in a dry box under a nitrogen atmosphere with the desired amount of cosolvent, surfactant and isobutylene. After assembling, the reactor was pressurized with CO$_2$ by using a compressed air driven gas booster (HASKEL) at room temperature until 200 grams CO$_2$ was collected (the amount of CO$_2$ was followed by disconnecting and weighing the reactor). After introducing the desired amount of CO$_2$, the reactor was immersed in a Dry Ice/isopropanol bath and cooled to the desired temperature (i.e., −40° C.). The temperature was maintained ±2° C. by controlling the amount of Dry Ice used for cooling. Then a piece of Hasteloy tube equipped with two Hasteloy pressure valves, containing the Friedel-Crafts acid (TiCl$_4$ or AlBr$_3$) between the two valves, was connected to one of the reactor's inlet valves. The polymerization was started by adding the Friedel-Crafts acid to the charge by using the gas booster. The polymerization was stopped by methanol addition by using a high pressure liquid pump (HASKEL). The two windows on the 300 mL reactor provided access for visual observation of the charge during polymerization. In Experiments 2–7 the charges were homogeneous and somewhat milky (like 2–3 drops of milk in a glass of water) before starting the polymerization. After mixing the Friedel-Crafts acids with the charges, as the polymerization proceeding the charges became white, milky, indicating the formation of increasing amounts of polymer droplets in the continuous liquid CO$_2$ phase stabilized by PIB-TMSS (Experiments 1–6) or TMSS-PIB-TMSS (Experiment 7) dispersing agents.

Experiment 1 was carried out in the absence of dispersing agent (control), the polymerization was heterogeneous: As soon as the Friedel-Crafts acid was added to the charge the PIB formed precipitated and floated on the surface of liquid CO$_2$. Sizable quantities of polymer seemed to have also precipitated on the wall of the reactor. In contrast, in Experiments 3–8, only a small amount (10% by weight of all PIB found) of PIB precipitated and no polymer deposition was observed on the walls. The polymerization charges remained milky white. In Experiment 3, when the PIB-TMSS dispersing agent was used, monomer conversion increased up to 75% as compared to 57% in the control of Experiment 1. The molecular weight distribution (MWD) of the PIB obtained was multimodal, but the ratio between the higher ($M_n$>20,000) and lower ($M_n$<20,000) molecular weight fractions has changed in favor to the higher molecular weights.

In Experiments 5 and 6, attempts were made to achieve controlled polymerization by introducing TMPCl initiator and DMA. The MWD of PIB obtained in these experiments became monomodal, but the lower than theoretical $M_n$ values and broad MWD indicated extensive chain transfer. Also, in Experiment 6, when AlBr$_3$ (which is soluble in liquid CO$_2$) was used to initiate the polymerization, low molecular weight PIB was obtained.

The lower monomer concentration employed in Experiments 3 and 5 did not change the conversion or $M_n$.

In Experiment 7, (Table I) the polymerization was carried out in a dry box, under dry nitrogen in a specially designed H-shaped glass pressure vessel consisting of two test tubes connected with a short glass tube. Prior to polymerization, one arm of the H-shaped vessel was charged with the needed amount of cosolvent, monomer, TMSS-PIB-TMSS dispersing agent and Dry Ice, while the Friedel-Crafts acid was placed in the other arm of the H-shaped vessel. Both of the arms were closed quickly with crown caps and the closed H-shaped reactor was immersed in a heptane bath maintained at −55° C. The monomer charge was milky and homogeneous. After the solid CO$_2$ melted and the liquid CO$_2$ phase formed (30–40 min), the polymerization was started by quickly pouring the Friedel-Crafts acid via the short connecting tube into the other half of the H-shaped reactor containing the milky monomer charge. Polymerization immediately ensued as indicated by the increasing milkiness in the glass tube. After 60 minutes the polymerization was stopped by freezing the charge rapidly in liquid nitrogen. The PIB was precipitated in methanol and dried in vacuum. The result of GPC analysis of the product is shown in Table I. The 15° C. decrease of the temperature (from −40° C. in Experiments 1–6 to 55° C. in Experiment 7) did not have much effect on the molecular weight and MWD of PIB obtained in Experiment 7.

Figure 4:
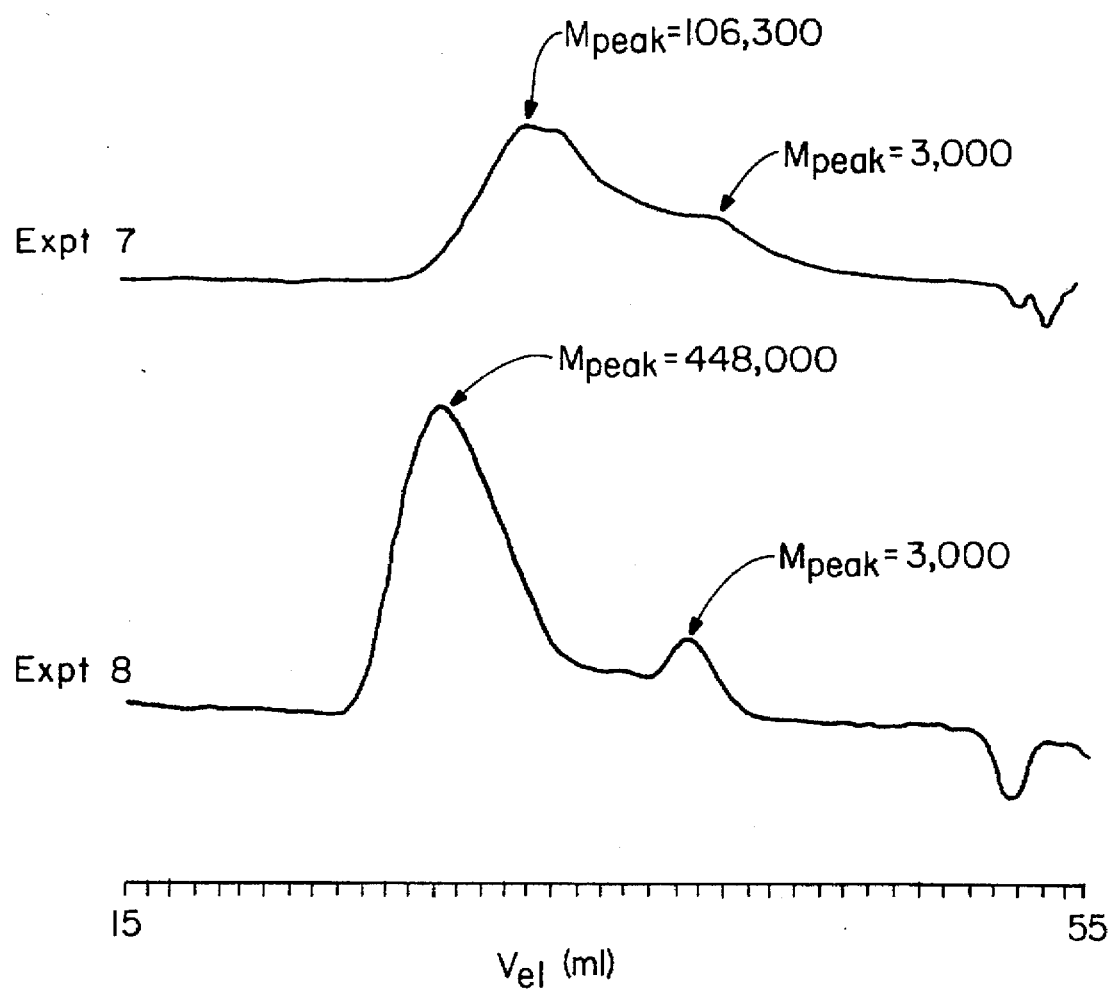
FIG. 4 shows GPC traces of PIB obtained using inventive initiator system and method of polymerization.

3. Dispersion Polymerization of IB in Liquid CO$_2$ at −55° C. in the Presence of Cp*TiMe$_3$/B(C$_6$F$_5$)$_3$ Initiator System Dispersion polymerization of IB was carried out in liquid CO$_2$ at −55° C. in the presence of Cp*TiMe$_3$/B(C$_6$F$_5$)$_3$ initiator system as follows:

In Experiment 8, the polymerization was carried out in a dry box, under dry nitrogen in an H-shaped glass pressure reactor as it is described in Experiment 7. Prior to polymerization one arm was charged with the predetermined amount of TMSS-PIB-TMSS dispersing agent in toluene solution form (0.08 gram dissolved in 1 mL toluene), 0.5 mL toluene solution of Cp*TiMe$_3$, B(C$_6$F$_5$)$_3$ (4.55 10$^{-3}$ mole) each and Dry Ice (resulting in 20 mL liquid CO$_2$ after melting). The monomer (2 mL IB) was placed in the other arm of the reactor. After closing both arms with crown caps, the H-shaped reactor was treated as in Experiment 7. The polymerization was started by pouring the monomer into the other arm containing the hazy, aged initiator/dispersing agent/liquid CO$_2$ charge. As soon as the monomer contacted the liquid CO$_2$ charge, vigorous polymerization occurred (the pressure of liquid CO$_2$ increased due to very fast exothermic reaction, and a small amount of CO$_2$ was discharged to the environment). After half an hour of polymerization, the pressure vessel was immersed in liquid nitrogen and the polymerization stopped. The resulting PIB was dissolved in hexanes and precipitated twice in methanol, and dried in vacuum overnight. The GPC results are shown in Table I, Experiment 8 and in FIG. 4.

4. Interpretation of Dispersion Polymerization Results

Figure 3:
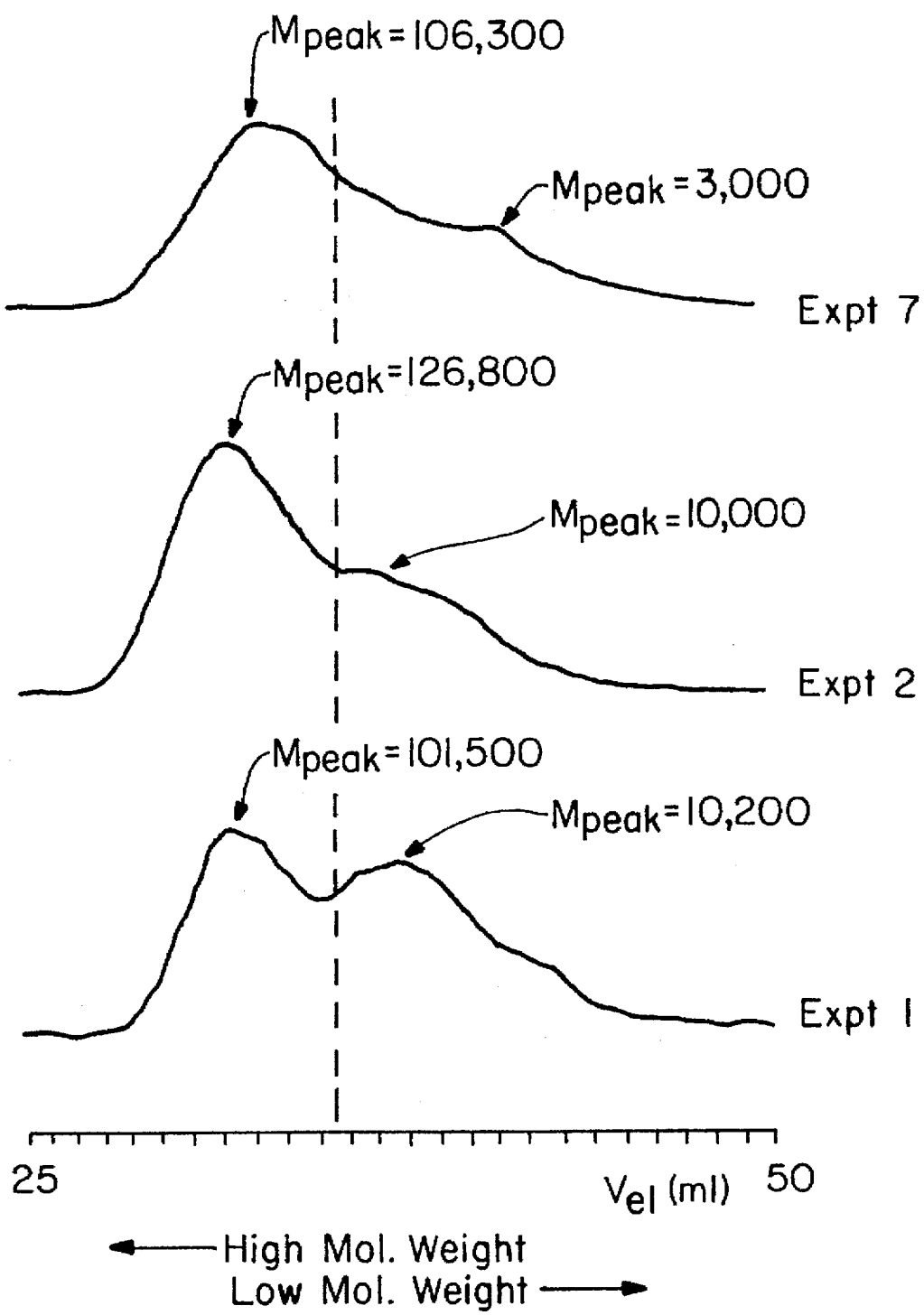
FIG. 3 shows GPC traces of PIBs obtained in liquid $CO_2$ in the absence and in the presence of dispersing agent.

The beneficial effect of using dispersing agents in the polymerization of IB becomes apparent by comparing the MWDs of PIBs obtained in Experiment 1 (absence of PIB-TMSS, "control") and Experiment 2 (presence of PIB-TMSS) and Experiment 7 (presence of TMSS-PIB-TMSS). In the absence of dispersing agents extremely fast uncontrolled polymerization occurs and the PIB precipitates as soon as it forms in the forms of large blobs floating on the liquid CO$_2$ and depositing on the walls of the reactor. The ratio of high molecular weight fraction of the product ($M_n$>20,000) and low molecular weight fraction ($M_n$<20,000) is approximately equal (see Experiment 1, FIG. 3).

In contrast, in the presence of PIB-TMSS the high/low molecular weight ratio is shifted toward the higher molecular weight fraction (about 70%). Evidently, uncontrolled, the polymerization occurs in the continuous liquid CO$_2$ phase and, in dispersion polymerization, in polymer micelles stabilized by the PIB-TMSS. The PIB formed in the liquid CO$_2$ phase rapidly precipitates, which prevents further molecular weight growth and thus produces relatively low molecular weight PIB. In contrast, in the presence of the dispersing agent, most of the IB is dissolved in the micelles and a lesser amount remains in the continuous CO$_2$ phase. The polymer micelles create large interfaces (surfaces) for controlled heat exchange during the polymerization and thus provides a desirable temperature equilibrated environment for the polymerization. Each micelle in the dispersed systems can be viewed as a tiny globular polymerization reactor with maximum heat exchange surface insuring maximum heat transport into the good heat sink of liquid CO$_2$. After polymerization the carbon dioxide can be vented and recovered providing for extremely simple solvent removal and recovery.

TABLE I

| | | | | | | | | | |
|---|---|---|---|---|---|---|---|---|---|
| Cationic dispersion Polymerization of IB in Liquid Carbon Dioxide (V = 200 mL, reaction time = 2 hrs) | | | | | | | | | |
| Experiment No. | Lewis acid coinitiator mole/L | Initiator | Cosolv v % | PIB-TMSS w % | IB mL | Temp C. | Yield % | $M_n$ g/mole | $M_w/M_n$ |
| 1 | $TiCl_4$ 2.9 $10^{-3}$ | "$H_2O$" | $CH_2Cl_2$ 10 | — | 30 | −40 | 57 | 101,500 10,200 | multimodal |
| 2 | $TiCl_4$ 2.9 $10^{-3}$ | "$H_2O$" | $CH_3Cl$ 10 | 1 | 30 | −40 | 75 | 126,800 10,000 | multimodal |
| 3 | $TiCl_4$ 2.9 $10^{-3}$ | "$H_2O$" | $CH_3Cl$ 10 | 1 | 10 | −40 | 64 | 117,000 9,000 | multimodal |
| 4 | $TiCl_4$ 2.9 $10^{-3}$ | TMPCl/DMA | $CH_3Cl$ 10 | 1 | 30 | −40 | 38 | 7,000 | 3.12 |
| 5 | $TiCl_4$ 2.9 $10^{-3}$ | TMPCl/DMA | $CH_3Cl$ 10 | 1 | 10 | −40 | 31 | 7,500 | 3.46 |
| 6 | $AlBr_3$ 2.4 $10^{-3}$ | "$H_2O$" | $CH_3Cl$ 10 | 1 | 30 | −40 | 40 | 5,300 | 5.02 |
| 7 | $TiCl_4$ 2.9 $10^{-3}$ | "$H_2O$" | $CH_3Cl$ 5 | 3 | 1 | −55 | 56 | 106,300 3,000 | multimodal |
| 8 | $B(C_6F_5)$ | $C_p*TiMe_3$ | Toluene 5 | 0.6 | 2 | −55 | 75 | 448,000 3,000 | multimodal |

Thus it should be evident that the agents and methods of the present invention are highly effective in providing for the improved polymerization of polyisobutylene. The dispersing agents and method of the present invention can be used separately with other polymerizations, methods and the like, as well as for the manufacture of other polymeric materials.

Based upon the foregoing disclosure, it should now be apparent that the use of the dispersing agents, initiators and methods described herein will carry out the objects set forth hereinabove. It is, therefore, to be understood that any variations evident fall within the scope of the claimed invention and thus, the selection of specific component elements, reactants, monomers, process conditions or the like, can be determined without departing from the spirit of the invention herein disclosed and described. Thus, the scope of the invention shall include all modifications and variations that may fall within the scope of the attached claims.

What is claimed is:

1. A dispersing agent for the dispersion polymerization of isobutylene in liquid $CO_2$, comprising a compound having a $CO_2$-phobic moiety and at least one $CO_2$-philic moiety; wherein said $CO_2$-phobic moiety includes a polyisobutylene moiety and wherein said at least one $CO_2$-philic moiety includes a siloxy silane moiety.

2. A dispersing agent as in claim 1, wherein said $CO_2$-phobic moiety further comprises at least one aliphatic hydrocarbon moiety whose monomer has from about 4 to about 20 carbon atoms.

3. A dispersing agent as in claim 2, wherein said $CO_2$-phobic moiety is a radical selected from the group consisting of

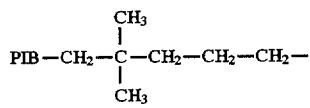

-continued and

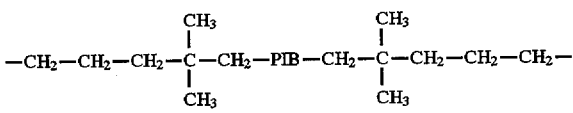

where PIB is

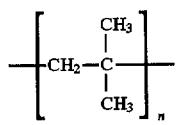

and where n is an integer of from 2 to about 50.

4. A dispersing agent as in claim 1, wherein said siloxy silane moiety is an alkyl siloxy silane having from about 9 to about 50 carbon atoms.

5. A dispersing agent as in claim 4, wherein said siloxy silane moiety is a radical having the structure

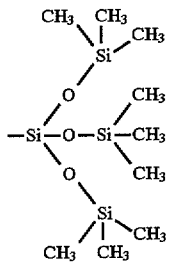

6. A dispersing agent as in claim 1, having a structure selected from the group consisting of

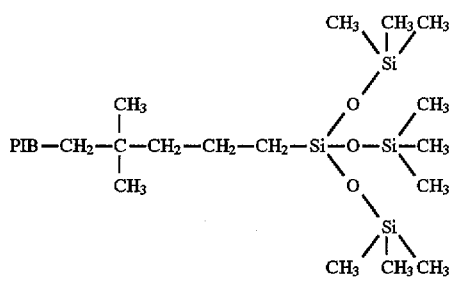

and

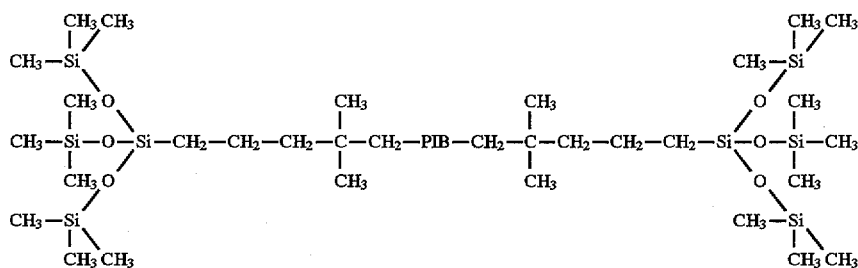

wherein PIB is

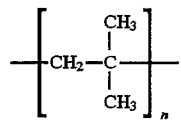

and n is an integer of from about 2 to about 50.

7. A method of preparing a dispersing agent comprising the steps of cationically polymerizing isobutylene with a Friedel-Crafts reagent, and a mono- or bi-functional polymerization initiator, resulting in a living polymer; terminating said living polymer with an allyl organosilane compound to produce an allyl-terminated polyisobutylene; and, hydrosilylating in the presence of a hydrosilating catalyst said allyl-terminated polyisobutylene by reacting said allyl-terminated polyisobutylene with a siloxy silane compound.

8. A method as in claim 7, wherein said Friedel-Crafts reagent is selected from the group consisting of TiCl4, AlCl$_3$, AlBr$_3$, BF$_3$, BCl$_3$, SnCl$_4$, ZnCl$_2$, ZrCl$_4$ and mixtures thereof.

9. A method as in claim 7, wherein said mono-functional polymerization initiator is selected from the group consisting of a protic acid and an allkyl halide having from 6 to 20 carbon atoms, and mixtures thereof.

10. A method as in claim 9, wherein said polymerization initiator is selected from the group consisting of 2-chloro-2,4,4-trimethylpentane and a branched hydrocarbon having from about 6 to about 20 carbon atoms, wherein said branched hydrocarbon has at least one halide.

11. A method as in claim 7, wherein said allyl organosilane compound is allyltrimethylsilane.

12. A method as in claim 7, wherein said siloxy silane compound is selected from the group consisting of mono-tris(trimethyl siloxy) silane and di-tris(trimethyl siloxy) silane.

13. The dispersing agent prepared according to claim 7.

14. A method for the preparation of polyisobutylene by the cationic polymerization of isobutylene monomer, comprising the step of: polymerizing isobutylene monomer dispersed in a medium containing liquid carbon dioxide, a cationic polymerization and a dispersing agent; said dispersing agent having a CO$_2$-phobic moiety and at least one CO$_2$-philic moiety; wherein said CO$_2$-phobic moiety includes a polyisobutylene moiety and wherein said CO$_2$-philic moiety includes a siloxy silane moiety.

15. A method as in claim 14, wherein said cationic polymerization initiator is selected from the group consisting of water, 2-chloro-2,4,4-trimethylpentane, dimethylacetamide, a protic acid and an alkyl halide having from 6 to 20 carbon atoms, and mixtures thereof.

16. A method as in claim 14, wherein said Friedel-Crafts acid is selected from the group consisting of TiCl4, AlCl$_3$, AlBr3, BF$_3$, BCl$_3$, SnCl$_4$, ZnCl$_2$, ZrCl$_4$ and mixtures thereof.

17. A method as in claim 14, wherein said cosolvent is selected from the group consisting of CH2Cl2, CH3Cl, toluene, ethylene dichloride, chlorobenzene, CS$_2$, SO$_2$, ethyl chloride and mixtures thereof.

18. A method as in claim 14, wherein said CO$_2$-phobic moiety further comprises at least one aliphatic hydrocarbon moiety having from about 4 to about 20 carbon atoms.

19. A method as in claim 18, wherein said CO$_2$- phobic moiety is a radical selected from the group consisting of

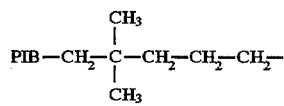

and

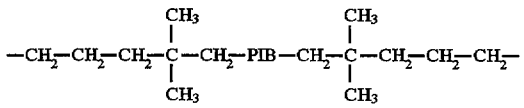

wherein PIB is

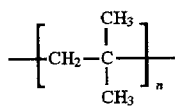

and where n is an integer of from about 2 to about 50.

20. A method as in claim 14, wherein said siloxy silane moiety is an alkyl siloxy silane having from about 9 to about 60 carbon atoms.

21. A method as in claim 20, wherein said siloxy silane moiety is a radical having the structure

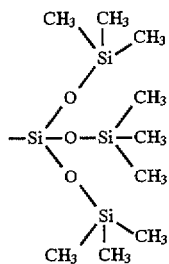

22. A method as in claim 14, wherein said dispersing agent has a structure selected from the group consisting of

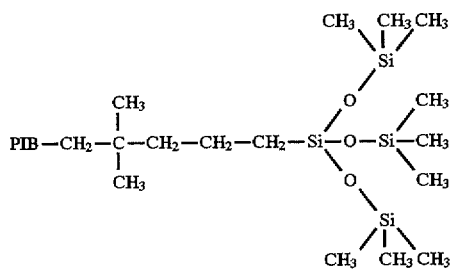

and

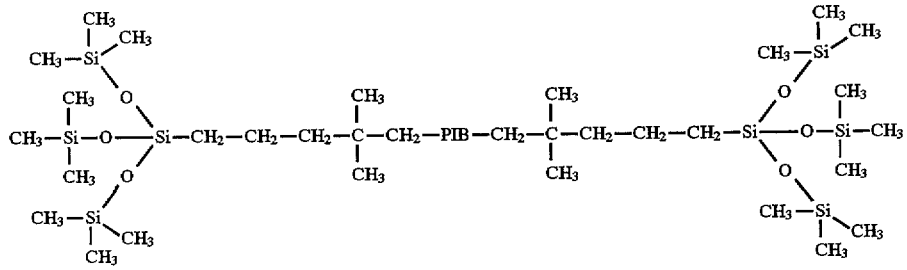

wherein PIB is

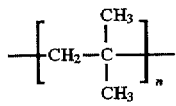

and where n is an integer of from about 2 to about 50.

23. A method for the preparation of polyisobutylene by the cationic polymerization of isobutylene monomer, comprising the step of: polymerizing isobutylene monomer dispersed in a medium containing liquid carbon dioxide, an organo-metallic polymerization initiator and a dispersing agent; said dispersing agent having a $CO_2$-phobic moiety and at least one $CO_2$-philic moiety; wherein said $CO_2$-phobic moiety includes a polyisobutylene moiety and wherein said at least one $CO_2$-philic moiety includes a siloxy silane moiety.

24. A method as in claim 23, wherein said organo-metallic polymerization initiator is a mixture of

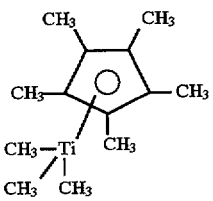

and $B(C_6F_5)_3$.

25. A method as in claim 23, wherein said organo-metallic polymerization initiator has a first and second component, said first component having the formula

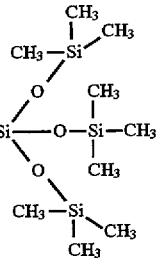

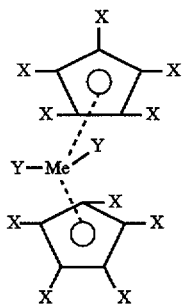

where Me is Ti, Zr or Hf; X is —H, —CH$_3$ or —C$_2$H$_5$; and Y is —Cl, —Br, —CH$_3$, —C$_2$H$_5$, —OCH$_3$, —OC$_2$H$_5$, —OiPr, —OiBu or —C$_6$H$_5$; and, said second component being selected from the group consisting of an alkylaluminoxane having the formula (RAlO)m where R is —CH$_3$ or —C$_2$H$_5$ and m is an integer of from 1 to about 50; and a phenylborate.

26. A method as in claim 25, wherein said phenylborate is selected from the group consisting of [Bu$_3$NH][B(C$_6$F$_5$)$_4$]; [Bu$_3$NH][B(C$_6$H$_5$)$_4$]; B(C$_6$F$_5$)$_3$ and B(C$_6$H$_5$)$_3$.

\* \* \* \* \*